(12) United States Patent
Tajiri et al.

(10) Patent No.: US 11,518,494 B2
(45) Date of Patent: Dec. 6, 2022

(54) COMPOSITE MATERIAL STRUCTURE AND MANUFACTURING METHOD OF COMPOSITE MATERIAL STRUCTURE

(71) Applicant: SUBARU CORPORATION, Tokyo (JP)

(72) Inventors: Keisuke Tajiri, Tokyo (JP); Megumi Hiraki, Tokyo (JP); Kousaburou Akiba, Tokyo (JP); Shigeru Tsuruta, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/177,412

(22) Filed: Feb. 17, 2021

(65) Prior Publication Data

US 2021/0362825 A1 Nov. 25, 2021

Related U.S. Application Data

(60) Division of application No. 16/210,230, filed on Dec. 5, 2018, now abandoned, which is a continuation of
(Continued)

(30) Foreign Application Priority Data

Sep. 29, 2016 (JP) .............................. JP2016-191211

(51) Int. Cl.
*B64C 3/18* (2006.01)
*B64C 3/34* (2006.01)
(Continued)

(52) U.S. Cl.
CPC .............. *B64C 3/182* (2013.01); *B29C 43/12* (2013.01); *B29C 43/18* (2013.01); *B29C 43/56* (2013.01);
(Continued)

(58) Field of Classification Search
CPC .. B64C 3/182; B64C 1/00; B64C 1/06; B64C 3/34; B64C 1/064; B64C 1/12;
(Continued)

(56) References Cited

U.S. PATENT DOCUMENTS 5,242,523 A 9/1993 Willden et al.
8,662,873 B2 3/2014 Winter et al.
(Continued)

FOREIGN PATENT DOCUMENTS

CN 101181833 A 5/2008
CN 103072284 A 5/2013
(Continued)

OTHER PUBLICATIONS

European First Office Action dated Sep. 7, 2021 in European Patent Application No. 17 85 5240.2 (5 pages).
(Continued)

*Primary Examiner* — Brian Handville
(74) *Attorney, Agent, or Firm* — Smith, Gambrell & Russell, LLP

(57) ABSTRACT

According to one implementation, a composite material structure includes a corrugated stringer and a panel. The corrugated stringer has a corrugated structure including portions each having hat-shaped cross section. The corrugated stringer is made of a composite material. The panel is integrated with the corrugated stringer. The panel is made of a composite material. Further, according to one implementation, a manufacturing method of a composite material structure includes: setting a textile on a laminated body of prepregs; and producing the composite material structure by covering the laminated body with a bagging film, forming a vacuum state in a space covered with the bagging film, impregnating the textile with the resin, and thermal curing of the laminated body of the prepregs. The laminated body is
(Continued)

a panel before curing. The textile has a structure corresponding to a corrugated stringer.

17 Claims, 6 Drawing Sheets

Related U.S. Application Data application No. PCT/JP2017/016848, filed on Apr. 27, 2017.

(51) Int. Cl.
| | |
|---|---|
| *B64F 5/10* | (2017.01) |
| *B29C 70/44* | (2006.01) |
| *B29C 70/68* | (2006.01) |
| *B32B 3/28* | (2006.01) |
| *B64C 1/06* | (2006.01) |
| *B64C 1/00* | (2006.01) |
| *B29C 43/18* | (2006.01) |
| *B29C 43/12* | (2006.01) |
| *B29C 43/56* | (2006.01) |
| *B29D 99/00* | (2010.01) |
| *B29K 105/08* | (2006.01) |
| *B29L 31/30* | (2006.01) |
| *B29K 307/04* | (2006.01) |
| *B29K 309/08* | (2006.01) |
| *B29C 43/36* | (2006.01) |

(52) U.S. Cl.
CPC .......... *B29C 70/443* (2013.01); *B29C 70/682* (2013.01); *B29D 99/0017* (2013.01); *B32B 3/28* (2013.01); *B64C 1/00* (2013.01); *B64C 1/06* (2013.01); *B64C 3/34* (2013.01); *B64F 5/10* (2017.01); *B29C 2043/3649* (2013.01); *B29K 2105/0872* (2013.01); *B29K 2307/04* (2013.01); *B29K 2309/08* (2013.01); *B29L 2031/3085* (2013.01)

(58) Field of Classification Search
CPC ... B64C 5/02; B64C 2001/0072; B29C 43/12; B29C 43/18; B29C 43/56; B29C 70/443; B29C 70/682; B29C 2043/3649; B29C 43/3642; B29D 99/0017; B32B 3/28; B32B 5/024; B32B 3/30; B32B 2250/02; B32B 2260/046; B32B 5/26; B32B 2260/023; B32B 2605/18; B32B 3/08; B64F 5/10; B29K 2105/0872; B29K 2307/04; B29K 2309/08; B29K 2105/04; B29K 2105/06; B29L 2031/3085; Y02T 50/40
See application file for complete search history.

(56) References Cited

U.S. PATENT DOCUMENTS

| | | | |
|---|---|---|---|
| 10,005,267 | B1 | 6/2018 | Boone et al. |
| 2003/0119398 | A1 | 6/2003 | Bogdanovich et al. |
| 2004/0256053 | A1* | 12/2004 | Burpo .................. B29C 66/721 156/305 |
| 2008/0302912 | A1 | 12/2008 | Yip et al. |
| 2010/0129589 | A1 | 5/2010 | Senibi et al. |
| 2011/0272086 | A1 | 11/2011 | Dittman et al. |
| 2012/0052247 | A1 | 3/2012 | Pook et al. |
| 2012/0119028 | A1 | 5/2012 | Griess et al. |
| 2012/0235336 | A1* | 9/2012 | Sana .................. B29C 43/3642 269/47 |
| 2014/0037778 | A1 | 2/2014 | Winter et al. |
| 2014/0053936 | A1 | 2/2014 | Huelnhagen et al. |
| 2014/0057514 | A1 | 2/2014 | Goto et al. |
| 2016/0214329 | A1 | 7/2016 | Fernandes et al. |
| 2020/0001547 | A1 | 1/2020 | Douglas et al. |

FOREIGN PATENT DOCUMENTS

| | | |
|---|---|---|
| EP | 1288124 A1 | 5/2003 |
| EP | 2 303 557 B1 | 5/2012 |
| EP | 3 587 249 A1 | 1/2020 |
| JP | H4-329125 A | 11/1992 |
| JP | 2003-053851 A | 2/2003 |
| JP | 2011-161976 A | 8/2011 |
| JP | 2011-528291 A | 11/2011 |
| JP | 2012-036295 A | 2/2012 |
| JP | 6401859 B2 | 10/2018 |
| WO | 2010/007417 A2 | 1/2010 |
| WO | 2018/061281 A1 | 9/2018 |

OTHER PUBLICATIONS

International Search Report with Written Opinion for PCT/JP2017/016848 dated Jul. 4, 2017 in English and Japanese Language (8 pages inclusive of English machine translation).

First Japanese Office Action dated May 29, 2018 in Patent Application 2017-523548 (6 pages inclusive of English machine translation).

Decision to Grant a Patent in Japanese Patent Application No. 2017-523548 (6 pages inclusive of English Machine translation).

International Preliminary Report on Patentability dated Apr. 11, 2019 for PCT Application No. PCT/JP2017/016848 (4 pages in Japanese with English translation).

Office Action for Chinese Patent Application No. 201780048576.7 dated Aug. 5, 2019 (5 pages in Chinese with English translation).

Search Report for Chinese Patent Application No. 201780048576.7 dated Jul. 30, 2019 and presumed communicated with the Aug. 5, 2019 Office Action (2 pages in Chinese).

Office Action for Chinese Patent Application No. 201780048576.7 dated May 8, 2020 (8 pages with machine translation).

Supplementary European Search Report Application No. 17855240 dated Apr. 14, 2020 (14 pages).

Benson et al., "Development of Textile Reinforced Composites for Aircraft Structures", International Symposium for Textile Composites, Oct. 14, 1998, pp. 1-9.

Hassan et al., Integral Manufacturing of Composite Skin-Stringer Assembly and Their Stability Analysis', Applied Composite Materials, Kluwer Academic Publishers, DO, vol. 11, No. 3, May 1, 2004, pp. 155-171.

Jinlian Hu, et al., Modeling formability of multiaxial warp knitted fabrics on a hemisphere, Jan. 2002, Elsevier, Composites: Part A 33, pp. 725-734.

Office Action for Chinese Patent Application No. 201780048576.7 dated Jan. 23, 2020 (15 pages in Chinese with machine translation).

Juliet Van Wagenen, "Boeing Starts Stringer Production for 737 Mas", (2 pages) Oct. 14, 2014, downloaded Feb. 25, 2020 from https://www.aviationtoday.com.

* cited by examiner

COMPOSITE MATERIAL STRUCTURE AND MANUFACTURING METHOD OF COMPOSITE MATERIAL STRUCTURE

CROSS REFERENCES TO RELATED APPLICATIONS

This is a divisional of U.S. patent application Ser. No. 16/210,230, filed Dec. 5, 2018.

U.S. patent application Ser. No. 16/210,230 is a continuation of Application PCT/JP2017/16848, filed on Apr. 27, 2017.

This application is based upon and claims the benefit of priority from Japanese Patent Application No. 2016-191211 filed on Sep. 29, 2016; the entire contents of which are incorporated herein by reference.

FIELD

Implementations described herein relate generally to a composite material structure and a manufacturing method of a composite material structure.

BACKGROUND

Conventionally, as technology for manufacturing a composite material structure using for an aircraft structure or the like, various technology, such as an autoclave molding method, an RTM (resin transfer molding) method and a VaRTM (vacuum assisted resin transfer molding) method, are proposed.

The method of molding a composite material without using autoclave molding equipment is called OoA (Out of autoclave). For that purpose, prepregs for OoA are also marketed. A prepreg is sheet like material consisting of fibers, such as carbon fibers or glass fibers, impregnated with resin before curing.

The RTM method is a molding method which molds a composite material by impregnating fibers, e.g., sealed in a mold, with a thermosetting resin and subsequent thermal curing of the fibers impregnated with the thermosetting resin. Since the RTM method does not require the autoclave molding equipment, manufacturing cost can be reduced. In addition, the RTM method does not use prepregs. and therefore, lamination process and shaping process of prepregs are unnecessary.

As a concrete example of application, in order to mold a composite material structure composed of a skin panel and stringers, of which cross sections are inverted T-shaped, attached to the skin panel, a process of manufacture where fibers impregnated with resin for the stringers are disposed on a laminate body of prepregs for the skin panel, using a mold, and subsequently, thermal curing is performed is proposed (for example, refer to Japanese Patent Application Publication JP2012-036295 A).

Meanwhile, the VaRTM method is an RTM method where fibers are impregnated with resin by a vacuum pressure (for example, refer to Japanese Patent Application Publication JP2003-053851 A). As a concrete example of application, a process of manufacture where the entire molding surface of a mold on which reinforcing fiber substrate is placed is covered with a bagging film, and subsequently, resin is injected and heated after vacuuming is proposed so that a composite material structure composed of a skin and stringers attached to the skin can be integrally molded. In this process of manufacture, prepregs for OoA are used for the skin while the reinforcing fibers impregnated with the resin are used for the stringers.

As for manufacturing a composite material structure, such as an aircraft structural object, improvement in production rate and reduction of manufacturing costs are problems to be solved. In particular, aircraft parts made of composite material have many problems such that the number of parts is large, labor of assembly work using fasteners is high, work for laying up prepregs into a complicated form according to a shape of composite material structure needs long time, and excessive capital spending including autoclave molding equipment is indispensable.

For that reason, an object of the present invention is to improve a production rate of composite material structure and reduce manufacturing costs of composite material structure.

SUMMARY OF THE INVENTION

In general, according to one implementation, a composite material structure includes: a corrugated stringer and a panel. The corrugated stringer has a corrugated structure including portions each having hat-shaped cross section. The corrugated stringer is made of a composite material. The panel is integrated with the corrugated stringer. The panel is made of a composite material.

Further, according to one implementation, a manufacturing method of a composite material structure includes: setting a textile on a laminated body of prepregs, for molding out of an autoclave, including fibers which can be impregnated with a resin by a vacuum pressure; and producing the composite material structure by covering the laminated body of the prepregs, on which the textile has been set, with a bagging film, forming a vacuum state in a space covered with the bagging film, impregnating the textile, in the vacuum state, with the resin, and thermal curing of the laminated body of the prepregs on which the textile impregnated with the resin has been set. The laminated body is a panel before curing. The textile has a structure corresponding to a corrugated stringer having a corrugated structure including portions each having a hat-shaped cross section. The composite material structure has a structure where the corrugated stringer is attached on the panel.

DETAILED DESCRIPTION

A composite material structure and a manufacturing method of a composite material structure according to implementations of the present invention will be described with reference to the accompanying drawings.

(First Implementation)
(Structure of Composite Material Structure)

Figure 1:
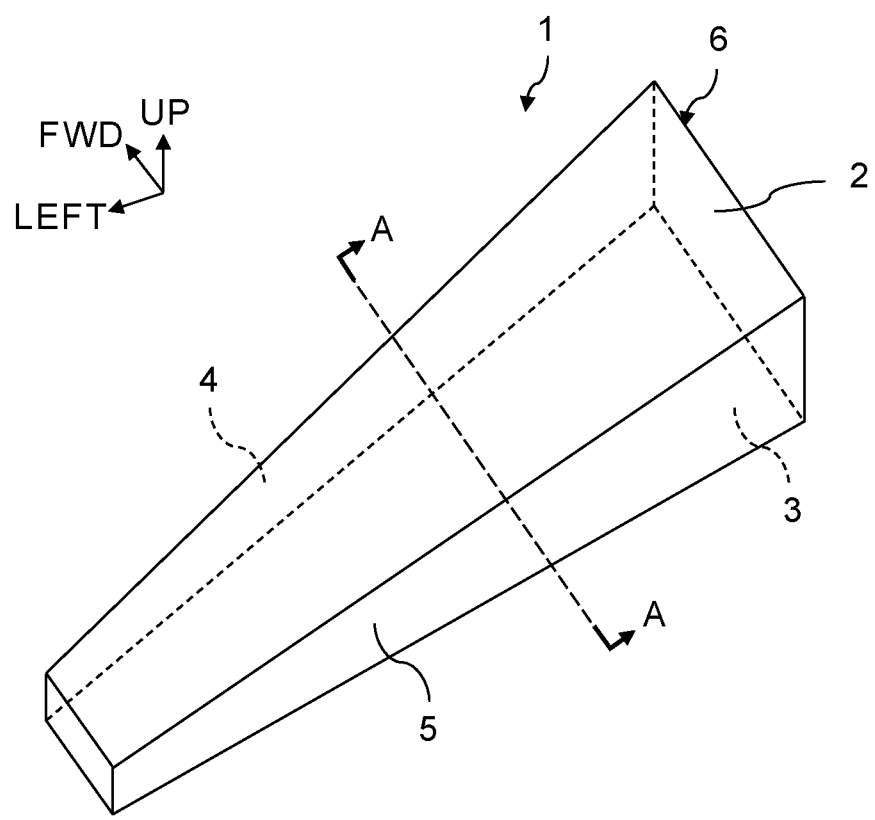
FIG. 1 is a perspective view of a composite material structure according to the first implementation of the present invention.
Figure 2:
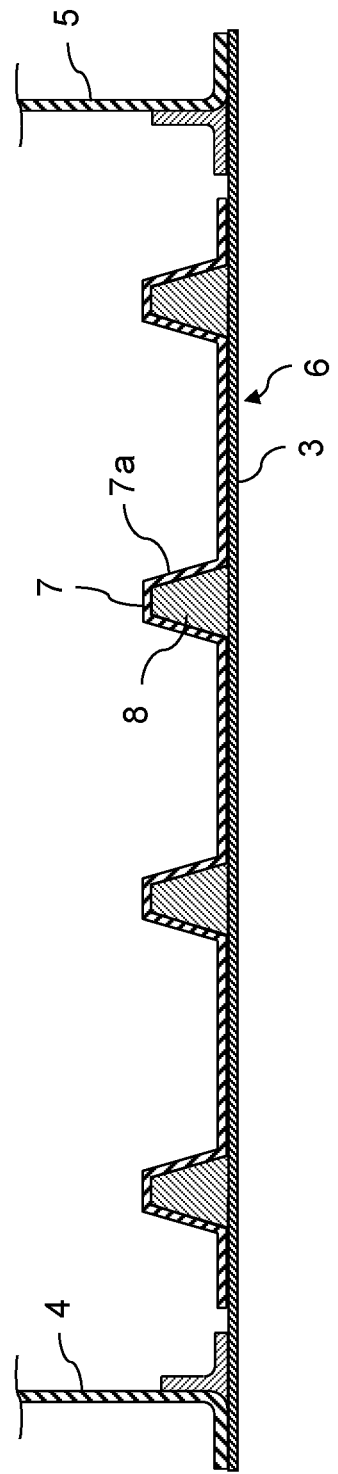
FIG. 2 is a partial cross sectional view of the composite material structure at the position A-A of FIG. 1.

FIG. 1 is a perspective view of a composite material structure according to the first implementation of the present invention, and FIG. 2 is a partial cross sectional view of the composite material structure at the position A-A of FIG. 1.

FIG. 1 shows a structure of a tail 1 of a typical passenger airplane. The tail 1 has a box-shaped structure in which an upper panel 2 is connected to a lower panel 3 with a front spar 4 in the front side and a rear spar 5 in the rear side. When the tail 1 is made of a composite material, such as GFRP (Glass fiber reinforced plastics) or CFRP (Carbon Fiber Reinforced Plastics), the tail 1 can be produced by integrally molding parts except the upper panel 2, and subsequently, assembling the integrally molded parts, in the lower panel 3 side, with the upper panel 2, for example. A composite material structures 6 may be a structure, such as the tail 1 exemplified in FIG. 1, which is produced by assembling a plurality of parts each made of a composite material, or may be a structure which is produced by integrally molding.

FIG. 2 shows a cross section of the lower panel 3 at the position A-A in FIG. 1. The lower panel 3 made of a composite material is reinforced by a corrugated stringer 7 made of a composite material. The corrugated stringer 7 is integrated to the lower panel 3 without using fasteners.

The corrugated stringer 7 has a corrugated structure in which a plurality of portions (hat parts 7a) each having a hat-shaped cross section are connected to each other. More specifically, the corrugated stringer 7 is a stringer whose adjacent hat parts 7a are reinforced by common fibers. Therefore, portions corresponding to flanges of stringers are common between a plurality of reinforcing structures.

Therefore, using the corrugated stringer 7 for reinforcing the composite material structure 6 can reduce the number of parts compared with a case of using a plurality of stringers. As a result, integral molding of stringer becomes possible. In addition, since the corrugated stringer 7 has a structure where hat-shaped stringers are connected to each other without fasteners, labor of assembly work can be reduced and manufacturing costs of the composite material structure 6 can be reduced compared with a case of assembling many stringers. Moreover, a second moment of area of the corrugated stringer 7 has a larger value than that of a T-shaped stringer, and therefore, weight to strength can be preferable.

The spaces generated between the corrugated stringer 7 and the lower panel 3 cause deformation of parts at the time of bagging. Accordingly, a foamed core material 8 is filled up inside the spaces generated between the corrugated stringer 7 and the lower panel 3, i.e., inside the respective hat parts 7a. Thereby, a form of the corrugated stringer 7 can be kept after molding. Accordingly, it becomes possible to cure the corrugated stringer 7 without placing jigs inside the hat parts 7a.

In addition, it is desirable to make the corrugated stringer 7 with a composite material produced by curing a preformed three dimensional textile impregnated with a resin, from a viewpoint of securing strength. A three dimensional textile is made by weaving fibers not into a plane but spatially. When a spatial coordinate system is defined with an X-axis and a Y-axis orthogonal to each other in a plane whose normal direction is a thickness direction of a composite material, and a Z-axis parallel to the thickness direction of the composite material, for example, length directions of fibers included in a three dimensional textile have not only component in the X-axis direction and component in the Y-axis direction but also component in the Z-axis direction.

That is, a three dimensional textile has fibers bearing strength in the thickness direction. Therefore, a composite material manufactured using a three dimensional textile has preferable strength in the thickness direction. Since fibers bearing strength in the thickness direction are those bearing strength in the Z-direction, they are often called Z yarns. Practical examples include a three dimensional textile where some fibers are disposed in a corrugated shape whose amplitude direction is a board thickness direction of a composite material.

Figure 3:
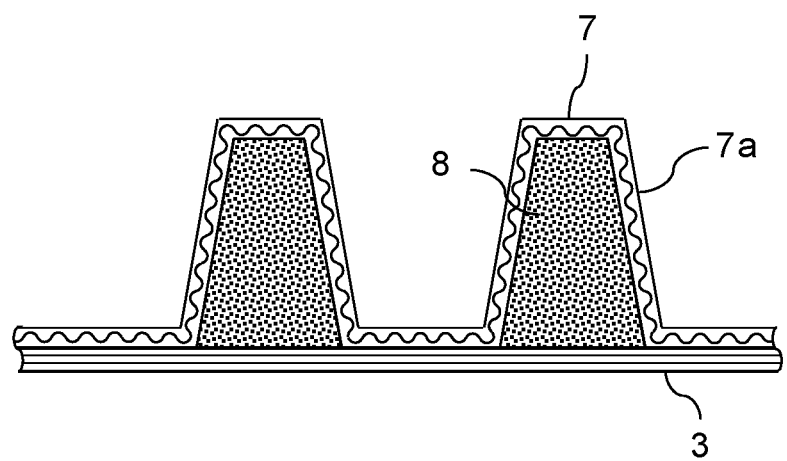
FIG. 3 is an enlarged sectional view of the composite material structure shown in FIG. 2 for explaining directions of fibers before curing.

FIG. 3 is an enlarged sectional view of the composite material structure 6 shown in FIG. 2 for explaining directions of fibers before curing.

As shown in FIG. 3, the corrugated stringer 7 having the corrugated cross section is integrated with the lower panel 3 without fasteners. Moreover, the foamed core material 8 is filled up in the space generated between each convex structure part of the corrugated stringer 7 and the lower panel 3, that is, inside each hat part 7a.

When the corrugated stringer 7 is produced by impregnating a three dimensional textile with resin, the corrugated stringer 7 is to be made of a composite material reinforced with woven fibers whose length directions include a board thickness direction of the corrugated stringer 7 and a direction perpendicular to the board thickness direction of the corrugated stringer 7, as shown FIG. 3. The direction of the board thickness of the corrugated stringer 7 periodically changes in a corrugated shape. Therefore, a direction of the Z yarns whose length direction include component in the board thickness direction also changes according to the board thickness direction. When some fibers are disposed in a corrugated shape, for example, the corrugated stringer 7 can be produced by impregnating, with resin, a three-dimensional textile in which the fibers have been woven so that an amplitude direction of the fibers disposed in the corrugated shape changes according to the board thickness direction as shown in FIG. 3.

On the other hand, the lower panel 3 can be made of a composite material produced by curing prepregs for OoA. A prepreg for OoA has characteristic such that fibers can be impregnated with resin by applying about a difference pressure between a vacuum pressure and an atmospheric pressure, and subsequently, the resin can be thermally-cured with an oven. A prepreg for OoA having such characteristic has been marketed by manufacturers of prepregs.

Although an example of co-curing the corrugated stringer 7 with the lower panel 3 has been shown in FIG. 2 and FIG. 3, as a matter of course, the corrugated stringer 7 may also be co-cured with the upper panel 2. Moreover, a desired panel made of a composite material, composing not only the tail 1 but a wing structure, such as a main wing or a center wing, can be integrated to the corrugated stringer 7.

(Manufacturing Method of Composite Material Structure)

Next, a manufacturing method of the composite material structure 6 will be described.

Figure 4:
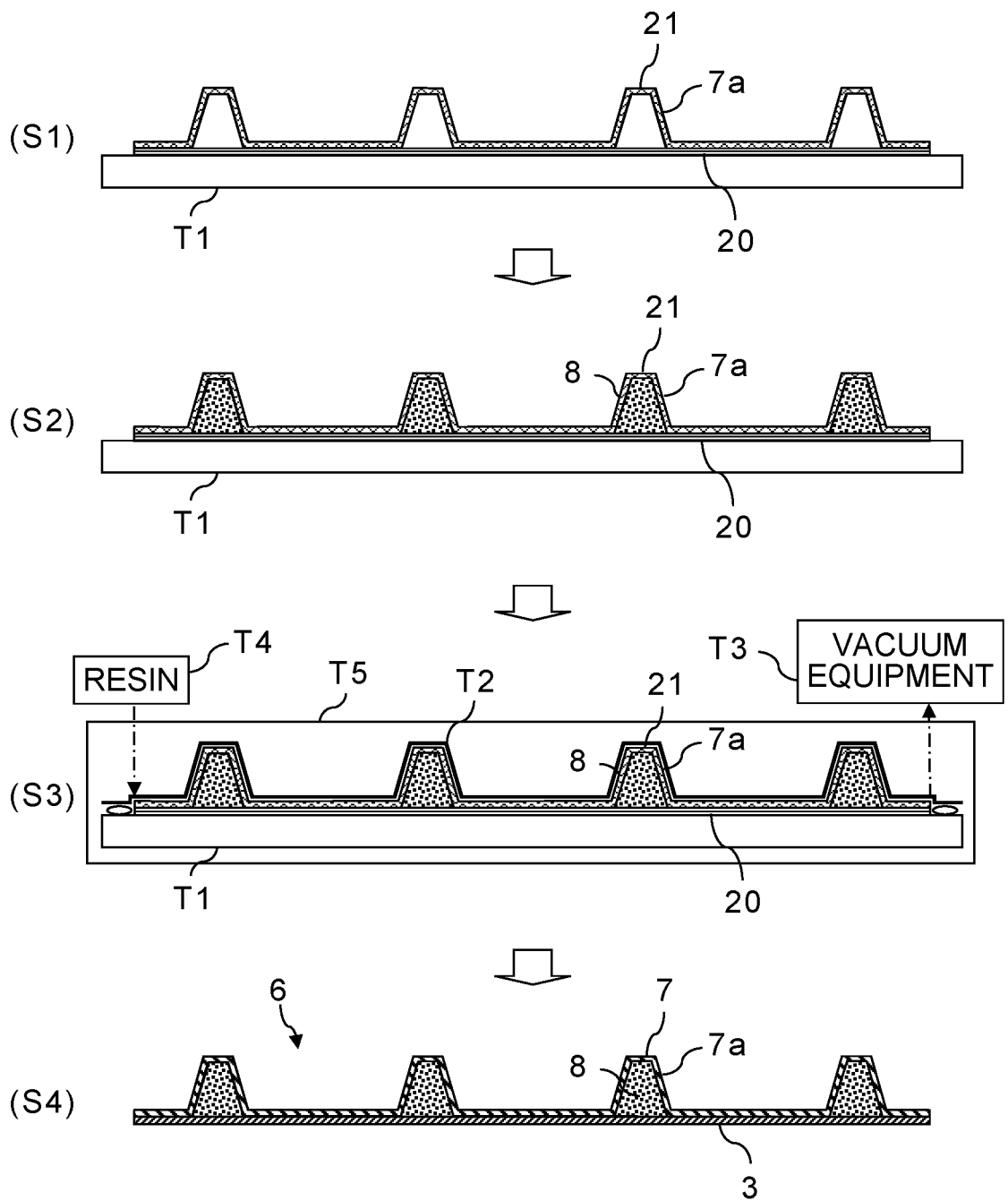
FIG. 4 is a flow chart showing a flow in a case of manufacturing the composite material structure having the cross sectional structure shown in FIG. 2.

FIG. 4 is a flow chart showing a flow in a case of manufacturing the composite material structure 6 having the cross sectional structure shown in FIG. 2.

Firstly, in step S1, a laminated body of prepregs 20 corresponding to the lower panel 3 before curing is set on a table T1. The laminated body of prepregs 20 corresponding to the lower panel 3 is produced by laminating prepregs for OoA of which fibers can be impregnated with resin by a vacuum pressure. Next, a textile 21 which has a structure corresponding to the corrugated stringer 7 having a corrugated structure including the hat parts 7a each having the hat-shaped cross section is set on the laminated body of prepregs 20. Preferably, a three dimensional textile, having a corrugated structure, where fibers have been woven three-dimensionally is set, as the textile 21, on the laminated body of prepregs 20 so that strength can be secured in the board thickness direction.

Next, in step S2, the foamed core material 8 is filled up in the insides of the hat parts 7a of the textile 21 respectively. Thereby, the form of the textile 21 corresponding to the corrugated stringer 7 is kept much more satisfactorily.

Next, in step S3, the composite material structure 6 is molded by VaRTM method. Specifically, the laminated body of prepregs 20 on which the textile 21 has been set is covered with a bagging film T2. The edges of the bagging film T2 can be stuck on the table T1 with sealant. Moreover, the cap of a vacuum equipment T3 is attached to the bagging film T2 so that the area inside the bagging film T2 can be decompressed. Furthermore, a resin reservoir T4 is connected to the area inside the bagging film T2 through a supply tube so that a resin can be supplied to the area inside the bagging film T2.

Subsequently, a vacuum state is made in the space covered by the bagging film T2 using the vacuum equipment T3. Then, the resin is supplied from the resin reservoir T4 to the space inside the bagging film T2 which has become the negative pressure state. Thereby, the textile 21 can be impregnated with the resin.

Furthermore, the laminated body of prepregs 20 on which the textile 21 impregnated with the resin has been set is cured by heating with an oven T5 with continuously applying the vacuum pressure. That is, the space covered with the bagging film T2 is vacuumized and heated so that the textile 21 is bonded with the laminated body of prepregs 20 and the laminated body of prepregs 20 on which the textile 21 has been set is cured.

Next, in step S4, the bagging film T2 is removed. Thereby, the composite material structure 6 having a structure in which the corrugated stringer 7 has been attached on the lower panel 3 can be produced as a product or a partially-processed product.

Note that, timing of filling up the foamed core material 8 inside the respective hat parts 7a may be changed voluntarily as long as the foamed core material 8 is filled at least before forming the vacuum state in the space covered with the bagging film T2.

(Effects)

As described above, the composite material structures 6 is produced by co-curing and integral molding of the corrugated stringer 7 and a panel by the VaRTM method. Moreover, the foamed core material 8 is filled up to keep shapes of the textile 21 for the corrugated stringer 7 before impregnating with a resin and the corrugated stringer 7 before curing, to which a vacuum pressure is applied.

Therefore, according to the composite material structure 6 and a manufacturing method of the composite material structure 6, production cost can be reduced while production rate can be improved. Specifically, equipment cost can be reduced since autoclave molding equipment and jigs, such as a shaping mold, become unnecessary. Further, the number of parts can be reduced, and positioning work of many parts and assembly work using fasteners, such as rivets, can be unnecessary by using the corrugated stringer 7 and co-curing the corrugated stringer 7 with a panel.

As a result, when the composite material structure 6 is an aircraft structure, the aircraft structure can be produced with a low cost and a high rate comparable to those of an aluminum structure. Thereby, it becomes possible to provide an aircraft structure for a future passenger plane in which reduction in manufacturing costs and improvement in a production rate are desired in particular.

Conventionally, the VaRTM method has had a problem that the stability in keeping a shape is low at the time of molding. Accordingly, when the corrugated stringer 7 as well as a hat-shaped stringer was intended to be molded by the VaRTM method, fibers inside a stringer might get twisted or a hat part could not sometimes bear a vacuum pressure, and thereby might be crushed.

On the contrary, according to the composite material structure 6 and a manufacturing method of the composite material structure 6, the foamed core material 8 is filled up inside each of the hat parts 7a. Therefore, it becomes possible to mold the corrugated stringer 7 stably even by the VaRTM method. Furthermore, when a three dimensional textile material is used as a material of the corrugated stringer 7, shape stability of the corrugated stringer 7 can be improved further. Accordingly, producing an aircraft structure, for which stably mass producing with high quality is required, becomes possible.

(Second Implementation)

Figure 5:
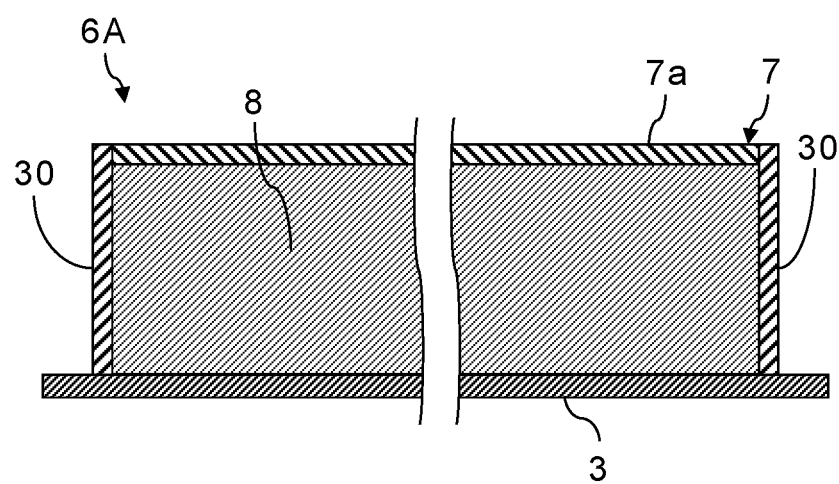
FIG. 5 a longitudinal sectional view showing a composite material structure according to the second implementation of the present invention.

FIG. 5 is a longitudinal sectional view showing a composite material structure according to the second implementation of the present invention.

FIG. 5 shows a section of the hat part 7a of the corrugated stringer 7 and the lower panel 3 included in the composite material structure 6A in the second implementation at a plane parallel to a length direction of the hat part 7a of the corrugated stringer 7 and perpendicular to the surface of the lower panel 3. The composite material structure 6A in the second implementation shown in FIG. 5 is different from the composite material structure 6 in the first implementation in structure in which the both ends of the corrugated stringer 7 are occluded. Since other structures and operations of the composite material structure 6A in the second implementation are not substantially different from the composite material structure 6 in the first implementation, only a longitudinal sectional view of the composite material structure 6A is shown and explanation for the same and corresponding elements will be omitted with attaching the same signs.

In the composite material structure 6A in the second implementation, the both ends of the hat parts 7a of which each inner side has been filled up with the foamed core material 8 are blocked. In an example shown in FIG. 5, plates 30 made of a desired material, such as a composite material or a metal, have been stuck on the both ends of each hat part 7a with sealant. Note that, sealant itself may be used to occlude the both sides of each hat part 7a instead of sticking the plates 30.

Thus, when the both ends of the corrugated stringer 7 are occluded so that the foamed core material 8 inside the corrugated stringer 7 is not exposed, the composite material structure 6A can be used as a part for a fuel tank of an aircraft. That is, even when the composite material structure 6A is used as a part of a container for a fuel tank, situation that fuel permeates the foamed core material 8 and deteriorates the foamed core material 8 does not arise. Therefore, it becomes possible to use the composite material structure 6A as a part of a main wing of an aircraft, which also serves as a fuel tank, for example.

(Modification of the Second Implementation)

Although an example case where the both ends of the corrugated stringer 7 are occluded so that the composite material structure 6A can be used as a fuel tank of an aircraft has been shown in FIG. 5, the foamed core material 8 may not be used to fill up the corrugated stringer 7. In this case, it is necessary to keep a shape of the corrugated stringer 7 without filling the foamed core material 8 at the time of molding the corrugated stringer 7. Accordingly, jigs which can be removed after curing a composite material may be placed instead of the foamed core material 8. Examples of a jig which can be removed after curing a composite material include a water-soluble mandrel, a bladder bag and the like.

A water-soluble mandrel is a rigid mandrel possible to dissolve with water. Therefore, water-soluble mandrels can be placed inside the hat parts 7a respectively at the time of molding the corrugated stringer 7 by the VaRTM method, and the mandrels can be dissolved with water and removed after curing the composite material structure 6A including the corrugated stringer 7. In this case, the composite material structure 6A can be also used as a part of a fuel tank since cavities are generated between the corrugated stringer 7 and the panel.

Meanwhile, a bladder bag is a soft jig which has flexibility and can be inflated with air.

Figure 6:
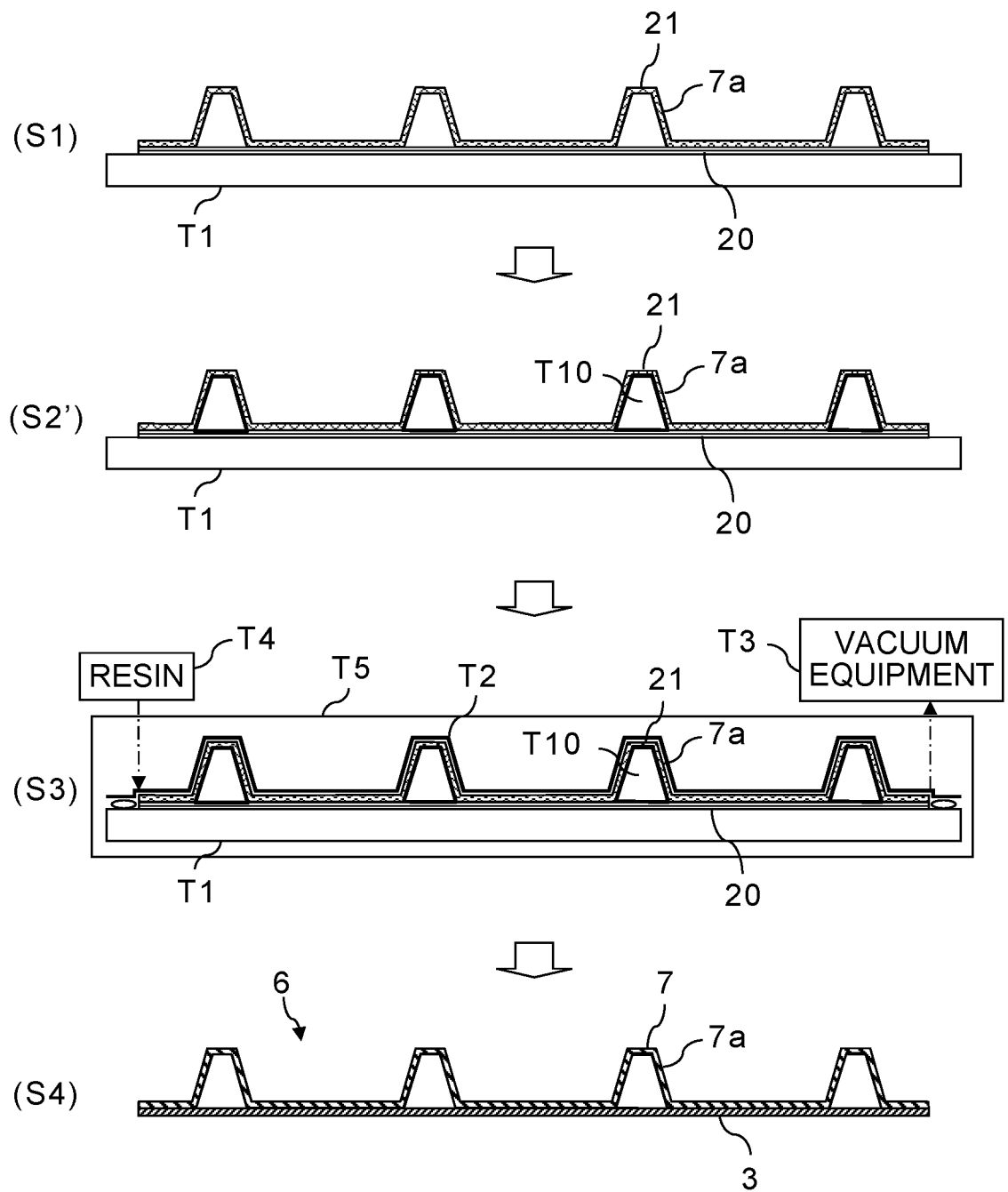
FIG. 6 is a flow chart showing a flow in a case where the corrugated stringer is integrally molded with the lower panel by VaRTM method using bladder bags.

FIG. 6 is a flow chart showing a flow in a case where the corrugated stringer 7 is integrally molded with the lower panel 3 by VaRTM method using bladder bags. Note that, a detailed explanation will be omitted for each step similar to a step shown in FIG. 4 with attaching the same sign.

Firstly, in step S1, the laminated body of prepregs 20 corresponding to the lower panel 3 before curing is set on the table T1 and the textile 21 corresponding to the corrugated stringer 7 is set on the laminated body of prepregs 20.

Next, in step S2', bladder bags T10 are placed inside the hat parts 7a of the textile 21 respectively. Thereby, the form of the textile 21 corresponding to the corrugated stringer 7 is kept much more satisfactorily. Note that, the bladder bags T10 may be placed before setting the textile 21.

Next, in step S3, the composite material structure 6 is molded by the VaRTM method. Next, in step S4, the bagging film T2 and the bladder bags T10 are removed. Thereby, the composite material structure 6 having a structure where the corrugated stringer 7 has been attached on the lower panel 3 can be produced as a product or a partially-processed product.

As mentioned above, jigs, such as water-soluble mandrels or the bladder bags T10, which can be removed after curing the laminated body of prepregs 20 on which the textile 21 has been set, for supporting the hat parts 7a from insides respectively can be placed inside the respective hat parts 7a at least before forming a vacuum state in the space covered by the bagging film T2. Then, the jigs can be removed after curing the laminated body of prepregs 20 where the textile 21 has been set.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A manufacturing method of a composite material structure comprising:
    setting a textile on a laminated body of prepregs for molding out of an autoclave, the textile having a structure corresponding to a stringer having a corrugated structure including portions each having a hat-shaped cross section;
    producing the composite material structure by covering the laminated body of the prepregs, on which the textile has been set, with a bagging film, forming a vacuum state in a space covered with the bagging film, impregnating the textile, in the vacuum state, with resin, and thermal curing of the laminated body of the prepregs, on which is set the textile impregnated with the resin, as to form a panel from the laminated body of the prepregs, and wherein the composite material structure has a structure where the stringer is attached on the panel;
    filling a foamed core material inside each of the portions each having the hat-shaped cross section, before at least forming the vacuum state in the space covered with the bagging film, and
    wherein both ends of each of the portions, each having the hat-shaped cross section, inside each of which the foamed core material has been filled are occluded so that the composite material structure can be used as a part of a fuel tank of an aircraft.

2. The manufacturing method of the composite material structure according to claim 1,
    wherein integrating the textile with the laminated body of the prepregs and curing the laminated body of the prepregs on which the textile has been set are performed by forming the vacuum state in the space covered with the bagging film and heating the laminated body of the prepregs on which the textile has been set.

3. A manufacturing method of a composite material structure comprising:
    setting a textile on a laminated body of prepregs for molding out of an autoclave, the textile having a structure corresponding to a stringer having a corrugated structure including portions each having a hat-shaped cross section; and
    producing the composite material structure by covering the laminated body of the prepregs, on which the textile has been set, with a bagging film, forming a vacuum state in a space covered with the bagging film, impregnating the textile, in the vacuum state, with resin, and thermal curing of the laminated body of the prepregs, on which the textile impregnated with the fiber penetrating resin is set, as to form a panel from the laminated body of the prepregs,
    wherein the composite material structure has a structure where the stringer is attached on the panel, and
    wherein a jig, that supports each of the portions, each having the hat-shaped cross section, from an inside and is removed after curing the laminated body of the prepregs on which the textile has been set, is set inside each of the portions before at least forming the vacuum state in the space covered with the bagging film, and the jig is removed after curing the laminated body of the prepregs on which the textile has been set.

4. The manufacturing method of the composite material structure according to claim 1, wherein individual prepregs of the laminated body of prepregs include uncured resin before curing of both the laminated body into the panel and the resin impregnated into the fiber.

5. The manufacturing method of the composite material structure according to claim 1, wherein the filling of the foamed core material inside each of the portions, each having the hat-shaped cross section, is carried out after the textile is set on laminated body of the prepregs.

6. The manufacturing method of the composite material structure according to claim 1, wherein impregnating the textile, in the vacuum state, with resin involves drawing resin from a resin reservoir though a supply conduit extending as to supply resin to the textile.

7. A manufacturing method of a composite material structure, comprising:
provinding a laminate stack of prepregs;
setting a corrugated shaped three dimensional fiber sheet onto the laminate stack of prepregs, the corrugated shaped three dimensional fiber sheet having a plurality of elongated members that each form a hat-shape in cross-section, the elongated members being spaced apart and integrally joined with connecting panels of the three dimensional fiber sheet that extend between respective pairs of adjacent elongated members;
covering the laminated body of the prepregs and the corrugated shaped three dimensional fiber sheet with a bagging film;
forming a vacuum state in a space covered with the bagging film,
impregnating the corrugated shaped three dimensional fiber sheet, while in the vacuum state, with resin; and
thermal curing of both the resin provided in the corrugated shaped three dimensional fiber sheet and the laminated body of the prepregs as to form a panel of the cured stack of prepregs of the laminated body and to join the resin impregnated corrugated shaped three dimensional fiber sheet to the panel.

8. The manufacturing method of the composite material structure according to claim 7, further comprising:
filling a foamed core material inside each of the elongated members, before at least forming the vacuum state in the space covered with the bagging film.

9. The manufacturing method of the composite material structure according to claim 8,
wherein both ends of each of the elongated members, inside each of which the foamed core material is provided, are occluded by end blockers that form a fuel seal at each end of the elongated members as to preclude fuel contact with the foamed core material.

10. The manufacturing method of the composite material structure according to claim 7,
wherein joining the corrugated shaped three dimensional fiber sheet with the laminated body of the prepregs and curing the laminated body of the prepregs on which the corrugated shaped three dimensional fiber sheet has been set are performed by forming the vacuum state in the space covered with the bagging film and heating the laminated body of the prepregs on which the corrugated shaped three dimensional fiber sheet has been set.

11. The manufacturing method of the composite material structure according to claim 7,
wherein a jig, that is provided as a support during vacuum application, is positioned in each of the elongated members, and is removed after curing the laminated body of the prepregs on which the corrugated shaped three dimensional fiber sheet has been set.

12. The manufacturing method of the composite material structure according to claim 7, wherein impregnating the corrugated shaped three dimensional fiber sheet with resin involves drawing resin from a resin reservoir though a supply conduit extending as to supply resin to the corrugated shaped three dimensional fiber sheet.

13. The manufacturing method of the composite material structure according to claim 7, wherein impregnating the corrugated shaped three dimensional fiber sheet with resin involves supplying resin as to fill in both an X-Y axes extension and a Z-axis thickness of the corrugated shaped three dimensional fiber sheet.

14. The manufacturing method of the composite material structure according to claim 7, wherein the corrugated shaped three dimensional fiber sheet includes a Z-axis fiber component forming a sinusoidal pattern with board thickness amplitude axes, and wherein each Z-axis board thickness amplitude axes maintains a perpendicular orientation despite configuration adjustments in the corrugation of the corrugated shaped three dimensional fiber sheet, and the impregnating of the corrugated shaped three dimensional fiber sheet with resin involves passing the resin within a board thickness space supported by the Z-axis fiber component of the corrugated shaped three dimensional fiber sheet.

15. The manufacturing method of the composite material structure according to claim 9, wherein the end blockers have an exterior peripheral edge that is received and sealed within an interior region of the elongated members.

16. The manufacturing method of the composite material structure according to claim 1, wherein both ends of the portions are occluded with end blockers that have an exterior peripheral edge that is received and sealed within respective interior regions of the portions.

17. The manufacturing method of the composite material structure according to claim 7, wherein, after joining the panel to the impregnated textile by curing, each of the portions having the hat-shaped cross section define hollow cavities extending along the portions.

* * * * *